Figure 1:
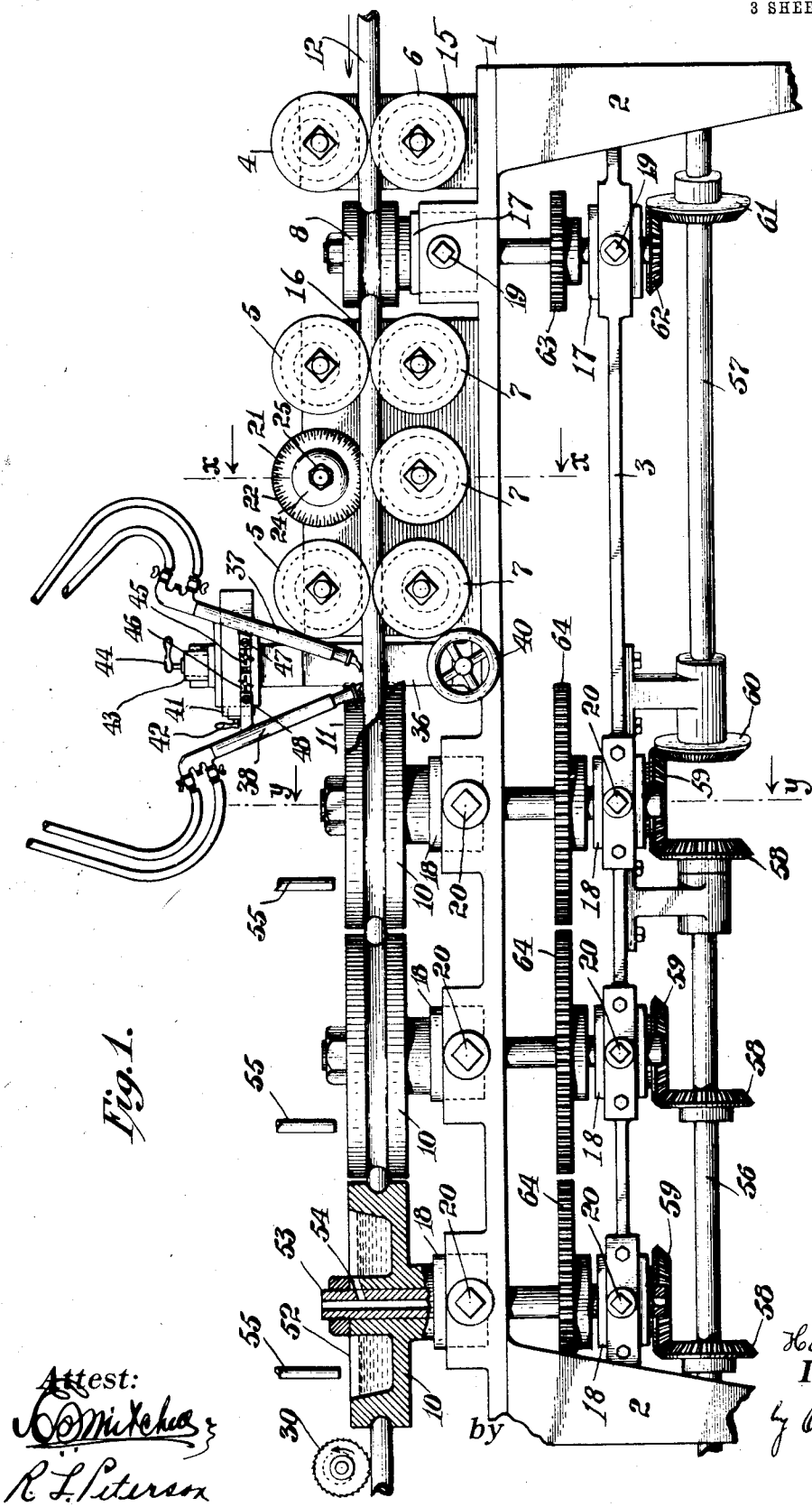

H. E. SNODGRASS.
APPARATUS FOR WELDING THE MEETING EDGES OF METALLIC ARTICLES.
APPLICATION FILED JAN. 10, 1912.

1,085,639.

Patented Feb. 3, 1914.

3 SHEETS—SHEET 1.

Attest:
J. O. Mitchell
R. L. Peterson

Inventor:
Harlan Eckley Snodgrass
by Otto Munk
his Atty

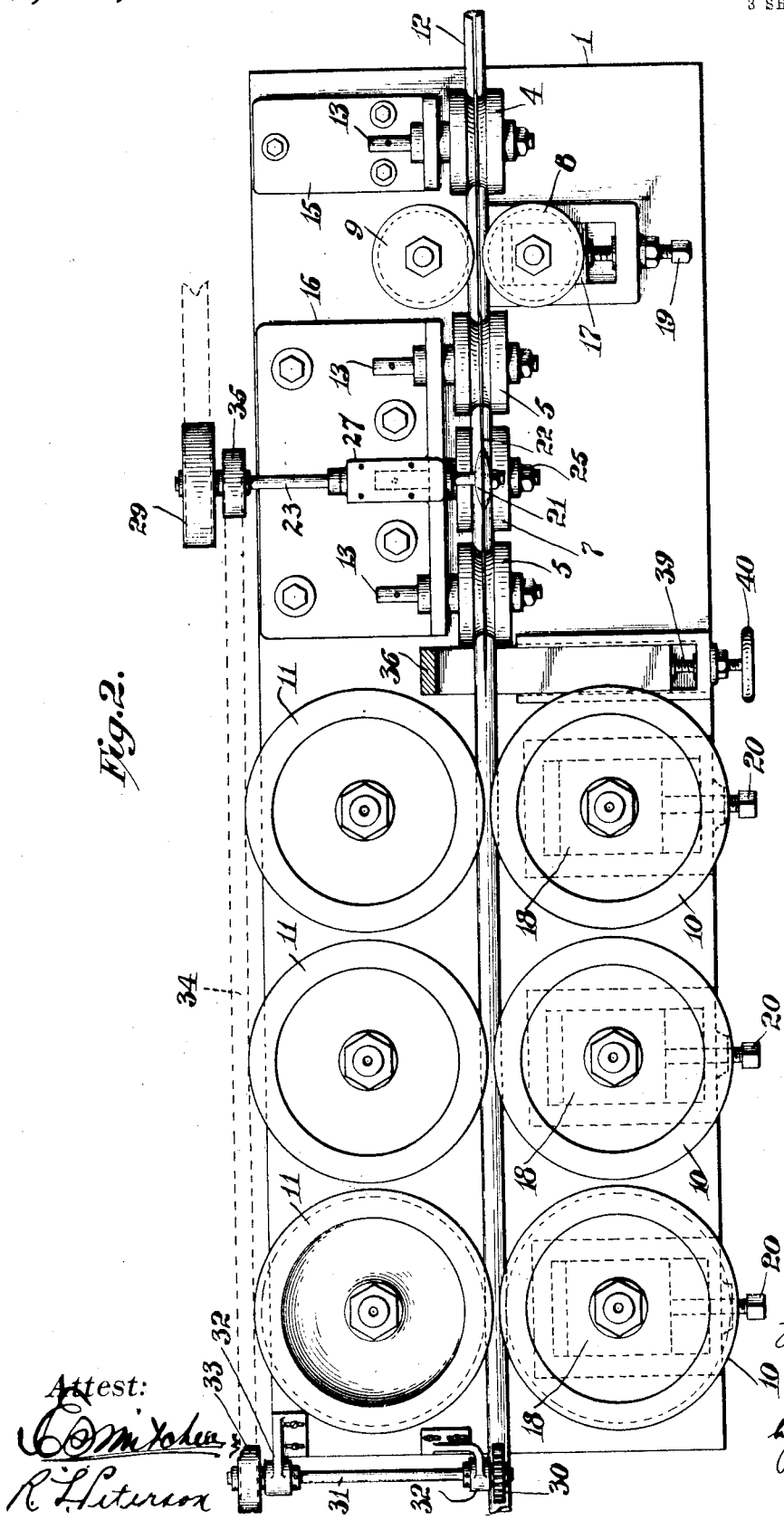

H. E. SNODGRASS.
APPARATUS FOR WELDING THE MEETING EDGES OF METALLIC ARTICLES.
APPLICATION FILED JAN. 10, 1912.
1,085,639.
Patented Feb. 3, 1914.
3 SHEETS—SHEET 3.
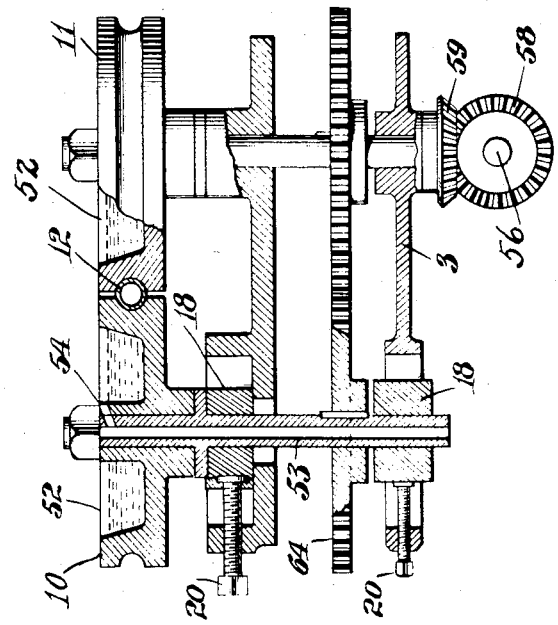
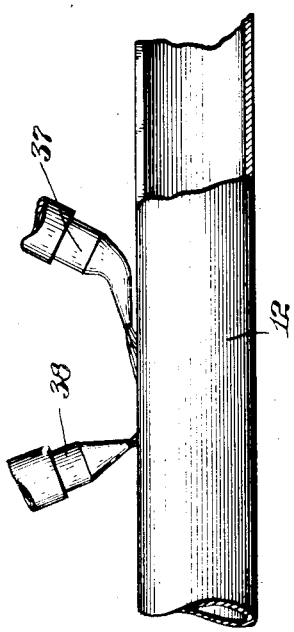
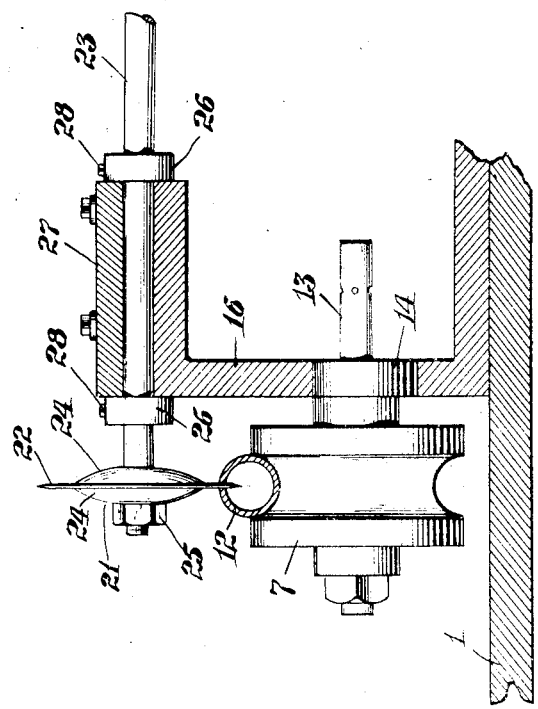
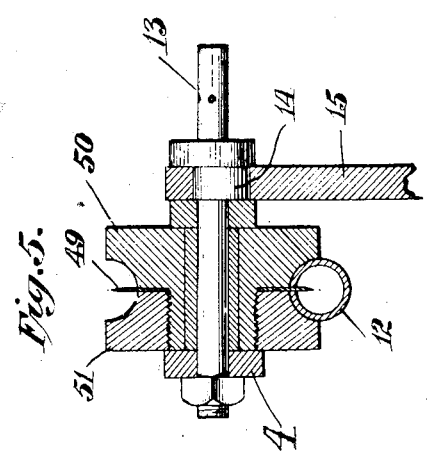
Attest:
Harlan Eakey Snodgrass
Inventor:
by
his Atty

UNITED STATES PATENT OFFICE.

HARLAN ESKEY SNODGRASS, OF NEWARK, NEW JERSEY.

APPARATUS FOR WELDING THE MEETING EDGES OF METALLIC ARTICLES.

1,085,639.  Specification of Letters Patent.  Patented Feb. 3, 1914.

Application filed January 10, 1912.  Serial No. 670,401.

*To all whom it may concern:*

Be it known that I, HARLAN ESKEY SNODGRASS, a citizen of the United States of America, residing in Newark, in the county of Essex and State of New Jersey, have invented certain new and useful Improvements in Apparatus for Welding the Meeting Edges of Metallic Articles, of which the following is a specification.

My invention relates to apparatus for joining together the meeting edges of metallic articles, but has especial reference to the automatic and continuous welding of the adjoining edges of one or more sheets of metal in the manufacture of tubes or pipes.

The principal objects of my invention are to increase the rapidity of the welding operation and to reduce the expense thereof; to confine the direct application of heat to the meeting edges of the parts to be welded together; to increase the strength of the weld and to insure its uniformity throughout; to prevent variations in the dimensions of the articles produced by welding, and to remove all scale and other surface roughness resulting from the welding operation.

With these and other ends in view, my invention consists in the details of construction and the arrangement and operation of parts hereinafter fully described, and more particularly pointed out in the appended claims.

The preferred embodiment of my invention is illustrated in the accompanying drawings, in which—

Figure 1 is a side elevation of the apparatus having one of the horizontally-disposed rolls shown in section and another partly broken away; Fig. 2 is a plan view of the apparatus; Fig. 3 is a sectional elevation on line X—X of Fig. 1; Fig. 4 is a sectional elevation on line Y—Y of Fig. 1; Fig. 5 is a transverse sectional elevation showing the details of one of the upper, vertically-disposed rolls, with its circular disk for guiding the seam of the tube, and Fig. 6 is a detail side elevation of a piece of tubing, showing the manner in which the two blowpipe flames are applied.

Similar characters of reference denote like parts in the several figures of the drawings.

The bed 1 is mounted upon suitable legs or frames 2, and may either be integral therewith or bolted or otherwise secured thereto. Extending between the legs 2, and supported thereby, is the horizontally-disposed plate 3, which is narrower than the bed 1 and serves as a support for the shafts and gearing by means of which power is transmitted to the mechanism mounted upon the bed 1. Various forms of beds and of framing and supporting members may be utilized, and those shown in the drawings are intended merely as being typical forms which are adapted for the intended purpose.

Mounted in suitable bearings and supported upon the bed 1 are the vertically-disposed grooved rolls, 4, 5, 6 and 7, and the horizontally-disposed grooved rolls 8, 9, 10 and 11. Rolls, 4, 5, 6 and 7 are idlers, and serve to support and guide the tube 12; the circular disks with which rolls 4 and 5 are fitted also serve to guide the seam of the tube and to separate the edges to be welded, as will be more fully described hereinafter. Rolls 8, 9, 10 and 11 are power-driven and are utilized to support and guide the tube and to impart longitudinal movement thereto during the welding operation; rolls 10 and 11 also force together the edges to be welded after they have been acted upon by the blowpipe flames, thus assisting in the welding operation and preventing variations in the dimensions of the articles produced by welding. As shown in Figs. 3 and 5, to provide for vertical adjustment of the rolls 4, 5, 6 and 7, the studs or shafts 13 on which these rolls are revolubly mounted are provided with enlarged portions or collars 14, which are circular in cross section and are eccentric to the center lines of the shafts. The eccentric enlargements or collars 14 are suitably mounted in the brackets 15 and 16, and by turning the shafts 13, rolls 4, 5, 6 and 7 may be raised or lowered. Horizontal adjustment of rolls 8 and 10 transversely of the bed 1 is provided for by mounting the shafts on which these rolls are keyed in bearing blocks 17 and 18, which are supported in suitable guideways and are adapted to be moved back and forth therein by means of the adjusting screws 19 and 20. I do not wish to limit myself to the number or arrangement of the rolls described herein and shown in the accompanying drawings, since manifestly these may be varied without departing from the spirit of my invention.

Mounted in a suitable bearing on bracket 16 is the scarfing tool designated generally as 21 (see Fig. 3) which is utilized for removing all bur, roughness and excess metal from the edges to be welded and insuring true contact between them throughout the length of the weld. This tool consists of a circular disk or blade 22 mounted upon a shaft 23 and held rigidly in place by two washers 24, one of which abuts against a shoulder formed near one end of shaft 23 while the other is forced tightly against disk 22 by means of a nut 25. Both sides of that portion of disk 22 which extends beyond washers 24 are scored or ridged radially or otherwise roughened so as to form a surface which is adapted to cut or abrade the edges of the parts to be welded together. Collars 26 are fitted upon shaft 23 at either end of the bearing 27, and are held in place by set screws 28 to secure the shaft against axial movement. Adjustment of the scarfing tool 21 transversely of the bed 1 is effected by loosening set screws 28, thus releasing collars 26, and moving shaft 23 in the desired direction. A pulley 29 is keyed upon shaft 23, and power is applied to this pulley to operate the scarfing cutter.

At the end of bed 1 toward which the tube is fed during the welding operation a milling cutter 30 is provided for removing all scale and surface roughness resulting from the welding operation. This cutter is keyed upon a shaft 31, which is journaled in bearings 32 mounted upon table 1. Adjustment of the position of the milling cutter transversely of the table is provided for by means of slotted holes for the bolts which secure bearings 32 to the table. To provide for vertical adjustment of the milling cutter, shaft 31 is fitted at each of the bearings 32 with eccentric enlargements or collars similar to those described hereinbefore in connection with rolls 4, 5, 6 and 7. At the outer end of shaft 31 a pulley 33 is keyed thereon, and power is applied to this pulley to operate the milling cutter. In Fig. 2 I have indicated a belt 34 for transmitting power to pulley 33 from pulley 35 on shaft 24, so that power for driving both the scarfing tool 21 and the milling cutter 30 may be received from pulley 29. However, it is manifest that other well known means may be employed for transmitting power to either the scarfing tool or the milling cutter or both.

Mounted upon the bed 1 between vertically-disposed rolls 5 and 7 and horizontally-disposed rolls 10 and 11 is the bracket 36 which carries the blowpipes 37 and 38, these being preferably of the oxy-acetylene type. Adjustment of the position of bracket 36 transversely of the bed 1 is provided for by supporting this bracket in suitable guideways in which it may be moved back and forth by means of the adjusting screw 39, operated by the hand wheel 40. To provide for regulating the position of the blowpipes longitudinally of the bed 1 and vertically relative thereto, I make use of devices similar to those commonly used for controlling the slide rests of machine lathes. Thus the position of the blowpipes may be adjusted longitudinally of the bed by moving the slide 41 by means of the adjusting screw 42, and vertically by moving the slide 43 by means of the adjusting screw 44. The distance between the two blow-pipes is regulated by means of slides 45 and 46 fitted into a suitable guideway in slide 41, adjustment of these slides being provided for by means of slotted holes for the bolts which hold the two slides in place in the guideway. Provision for adjustment of the angles of inclination of the two blowpipes to the tube 12 is made by securing the blowpipes to slides 45 and 46 by means of screws 47 and 48. By loosening these screws slightly the angles of the blowpipes may be adjusted and when the screws are driven tightly into place the blowpipes are held at the angles to which they have been set. Blowpipe 37 is mounted so that its nozzle is inclined at a sharp angle to tube 12 and thus the lower side of the blowpipe flame impinges upon the tube. Blowpipe 38 is mounted in a more nearly vertical position, so that the tip of its flame is directed upon the tube and the application of heat from blowpipe 38 is more concentrated and intense than that from blowpipe 37. The object of this arrangement of the two blowpipes is to increase the speed of the welding operation by preheating with the flame from blowpipe 37 the edges of the parts to be welded and completing the welding operation by a more concentrated and intense application of heat from blowpipe 38.

As shown in detail in Fig. 5, rolls 4 and 5 are provided with circular disks or blades 49 located in the center lines of the recesses or grooves in the peripheries of the rolls. Each of these rolls consists of two parts 50 and 51, 50 having a threaded extension or hub and 51 being screwed thereon. The guiding disk or blade 49 fits loosely over the threaded extension of 50, and is held securely in place between the adjacent faces of 50 and 51.

Two or more of the rolls 10 and 11 are cored out, as indicated at 52 in Figs. 1 and 4, to form a receptacle for water for cooling the rolls. The water-cooled rolls are mounted upon hollow shafts 53, and openings 54 permit the water to pass from the rolls into the hollow shafts and thence downward and out at the lower ends of the shafts. Circulation of the cooling water is thus provided for, the water being supplied to the rolls through pipes 55 which discharge into the receptacles 52.

As shown in Figs. 1 and 4, power applied to shaft 56 is transmitted to the horizontally-disposed rolls 8, 9, 10 and 11, to feed the tube 12 beneath the blowpipes 37 and 38, by means of the shaft 57 which is inclined in a horizontal plane in the direction of the shafts of the rolls 8 and 9, the bevel gears 58, 59, 60, 61 and 62, and spur gears 63 and 64 which are keyed on the shafts of rolls 8 and 10 and mesh with similar gears (not shown) keyed on the shafts of rolls 9 and 11. While it is essential that power be transmitted to one or more of the pairs of coacting, horizontally-disposed rolls, it is immaterial for the purposes of my invention how the power-transmission mechanism is constructed, arranged and operated, and I do not wish to be limited to mechanical details in this respect.

The operation of my invention will be clearly understood from the following description. The tube, which has previously been rolled or otherwise bent by known means into the desired shape, is introduced between the rolls 4 and 6 with the seam uppermost and in position to be entered by the disk 49 of roll 4. The tube is then advanced until it is engaged by the power-driven rolls 8 and 9, which feed it automatically between the coacting rolls 5 and 7 and beneath the flames from the blowpipes 37 and 38. The disks 49 of rolls 4 and 5 enter the seam of the tube and remain in engagement therewith throughout its passage between said rolls and rolls 6 and 7, so that the seam of the tube, instead of the tube itself, is guided in its passage beneath the blow-pipe flames. Further offices of disks 49 of rolls 4 and 5 are to open the seam of the tube to a greater or less extent, so that the edges at the seam press more or less tightly against the abrasive surfaces of the tool 21, to thus regulate the amount of metal that is removed from the tube blank by the tool 21, and also to maintain a slight separation of the edges to be welded together as they are fed beneath the blow-pipe flames, thus permitting said flames to enter the seam and impinge upon the juxtaposed surfaces of the tube blank. The rapidity of the welding operation is increased both by the application of heat directly to the surfaces to be welded together and by the use of a plurality of blow pipes so arranged that the application of heat to the tube blank is progressive. The original blank is cut sufficiently larger than would ordinarily be required for a tube of the desired dimensions to compensate for the metal to be removed by the finishing tool from the edges to be welded together. The scarfing cutter 21 removes all bur, roughness and excess metal from the edges of the tube blank and insures true contact between the juxtaposed surfaces at all points, thus increasing the strength of the weld and rendering it uniform throughout. This scarfing tool 21 also coöperates with the rolls 4, 5, 6, 7, 8 and 9 and the disks 49 to finish the blank to uniform shape and dimensions, with parallel straight edges, before it is subjected to the action of the blowpipe flames. After passing beneath the flames from the blowpipes, the tube is introduced between rolls 10 and 11, the offices of which are to force the fused edges tightly together, to insure uniform shape and dimensions of the articles produced by welding and to coöperate with rolls 8 and 9 in feeding the tube beneath the blowpipe flames. To prevent excessive heating of rolls 10 and 11, due to their proximity to the blowpipe flames or by contact with the heated tubes, as many as necessary of these rolls may be water-cooled. This also promotes quick setting of the weld. As the welded tube emerges from between the last pair of rolls 10 and 11 it is acted upon by the milling cutter 30 which removes all scale or other surface roughness resulting from the welding operation. When it is desired to make a change in the shape or dimensions of the article to be welded, corresponding changes are made in the rolls 4, 5, 6, 7, 8, 9, 10 and 11 or in such other means as may be employed for supporting, guiding and feeding the articles to be welded.

In numerous details, to some of which attention has not been specifically directed herein, my improvement may be varied or modified without departing from the spirit of my invention as set forth in the appended claims.

Having thus described my invention, what I claim as new and desire to secure by Letters Patent of the United States, is:—

1. Apparatus for welding the meeting edges of preformed metallic tubes, embodying therein rotatably mounted means having peripheral projections for entering the seam of the tube and guiding the latter in its passage through part of the apparatus, blow pipe welding means for fusing the edges of the tube, and means for feeding said tube to present successive parts of the seam to the welding means.

2. Apparatus for welding the meeting edges of preformed metallic tubes, embodying therein a series of rotatably mounted idlers certain thereof having projecting disks to enter the seam of the tube to be welded, blow pipe welding means for fusing the edges of the tube, and means for feeding said tube to present successive parts of the seam to the welding means.

3. Apparatus for welding the meeting edges of preformed metallic tubes, embodying therein rotatably mounted means for entering the seam of the tube and guiding the latter in its passage through part of the apparatus, means for abrading the edges of the seam to be welded, blow pipe welding means for fusing the edges of the tube, and means for feeding said tube to present successive parts of the seam to the welding means.

4. Apparatus for welding the meeting edges of preformed metallic tubes, embodying therein rotatably mounted means for entering the seam of the tube and guiding the latter in its passage through part of the apparatus, a rotatably mounted disk having lateral abrasive faces to abrade the edges of the seam to be welded, blow pipe welding means for fusing the edges of the tube, and means for feeding said tube to present successive parts of the seam to the welding means.

5. Apparatus for welding the meeting edges of preformed metallic tubes, embodying therein rotatably mounted means for entering the seam of the tube and guiding the latter in its passage through part of the machine, a plurality of blow pipes inclined at different angles in relation to the seam in the tube, and means for feeding said tube to present successive parts of the seam to the blow pipes.

6. Apparatus for welding the meeting edges of preformed metallic tubes, embodying therein rotatably mounted means for entering the seam of the tube, and guiding the latter in its passage through part of the machine, a plurality of blow pipes inclined at different angles in relation to the seam in the tube, means whereby each of said blow pipes may be individually adjusted, and means for feeding said tube to present successive parts of the seam to the blow pipes.

7. Apparatus for welding the meeting edges of preformed metallic tubes, embodying therein a plurality of pairs of vertically arranged rotatably mounted rolls certain thereof having projecting disks for entering the seam of the tube to be welded, means between two pairs of said rolls for abrading the edges of the seam in the tube, blow pipe welding means for fusing the edges of the tube, and means for feeding said tube to present successive parts of the seam to the welding means.

8. Apparatus for welding the meeting edges of preformed metallic tubes, embodying therein a plurality of pairs of vertically arranged rotatably mounted rolls near the feed end of the apparatus, projecting disks carried by certain of the upper rolls of said pairs and adapted to enter the seam of the tube to be welded, a pair of horizontally arranged power driven feed rolls adjacent the first pair of vertical rolls, an abrading tool rotatably mounted adjacent the last pair of vertical rolls, a plurality of blow pipes adjacent the last pair of vertical rolls, said blow pipes being inclined at different angles in relation to the seam to be welded, means for adjusting said blow pipes, and a series of horizontally arranged power driven rolls for feeding the tube through the apparatus.

In testimony whereof I have affixed my signature in presence of two witnesses.

HARLAN ESKEY SNODGRASS.

Witnesses:
 GUSTAVUS A. RICHARDS,
 ROSCOE L. PETERSON.